Patented Sept. 24, 1940

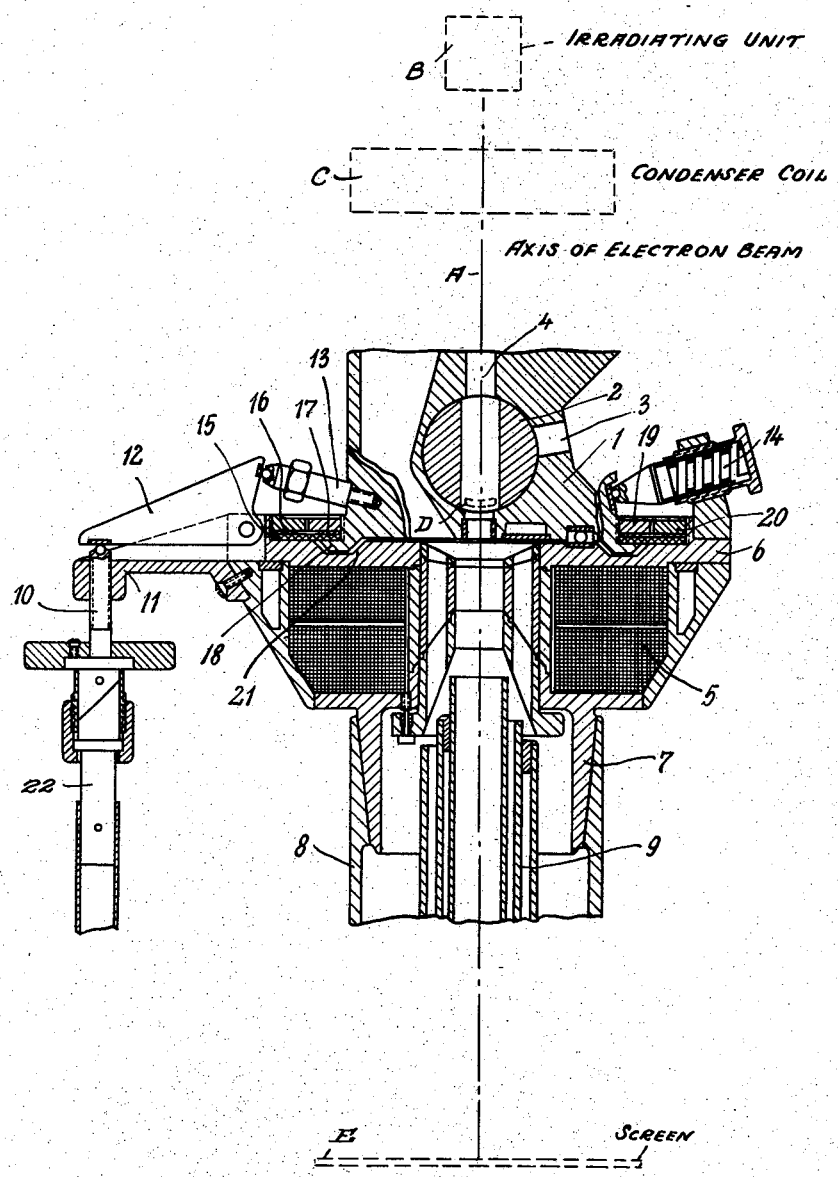

UNITED STATES PATENT OFFICE 2,215,979

ELECTRON MICROSCOPE

Hans Schuchmann, Berlin-Spandau, Germany, assignor to "Fides Gesellschaft für die Verwaltung und Verwertung von gewerblichen Schutzrechten mit beschränkter Haftung," Berlin, Germany, a corporation of Germany Application October 24, 1939, Serial No. 300,932
In Germany October 19, 1938

5 Claims. (Cl. 250—141)

2,215,979

The present invention relates to electron microscopes and to means for adjusting individual elements thereof relative to each other.

For adjusting electron microscopes, it is often necessary to provide certain individual elements thereof to be movable relative to each other. If the elements to be adjusted include a wall portion of the vacuum vessel of the electron microscope, it is necessary to provide suitable means for sealing the joint between the relatively movable elements to preserve the vacuum. For this purpose, prior to the invention, the elements in question have been connected by means of rubber sleeves such sleeves have the disadvantage of requiring considerable space, and their mounting on the elements involves difficulty.

It is therefore one of the objects of the present invention to provide suitable means for adjusting two elements of an electron microscope relative to each other without affecting the vacuum conditions in the microscope vessel.

Another object of the invention is the provision of a mechanism for tightly sealing the joint between two elements of an electron microscope.

A further object of the invention is to provide a mechanism of the type described, which is of great simplicity of construction and operation and requires only very little space.

It is a further specific object of the present invention to provide an electron microscope which allows shifting a microscope portion containing a sluicing device for inserting the object to be examined relative to another portion containing the objective coil, while maintaining these portions evacuated despite such shifting.

According to the invention the above objects are attained by providing the joint between two relatively movable vessel portions of an electron microscope with a packing ring of elastic material, such as natural or artificial rubber or the like, and with a pair of rings placed on the packing ring for compressing the same, and, further, with a pair of rings adapted to be screwed against the compressing rings for forcing the same against the resilient packing ring so as to press the outer portion of the latter against one element of the electron microscope and the inner portion thereof against the other element of the electron microscope.

These and other objects, features and advantages of the present invention will appear from the following detailed description of the embodiment illustrated in the accompanying drawing.

The drawing shows a cross section through an electron microscope according to the invention, only that portion of the microscope being shown in detail which is essential for the invention, while the conventional elements of the microscope are indicated schematically. The electron beam represented by its electron-optical axis A issues from an irradiating unit B and passes through an electron-optical condensing lens C, the object to be examined D, and a magnifying lens system to be described in the following and, after being modified by the structure of the object and by the lens system, impinges upon a luminescent or photosensitive screen E. The aforementioned elements are enclosed in a vacuum vessel, part of which is formed by the elements 1 and 7, 8 presently to be described.

The microscope portion between the irradiating unit or condenser coil and the screen, this intermediate portion being illustrated in detail, comprises a sluice member and a lens member which are shiftable relative to each other in a radial plane of division with respect to the electron-optical axis. The sluicing member comprises a sluice carrier or body 1 and a rotatable sluice element 2 having a transversal bore which in the illustrated position connects the axial bore 4 of the sluice body 1 with the lower portion of the microscope vessel and which when brought in registry with bore 3 may be provided with the object to be tested. The construction of such a sluicing device does not represent the invention proper. The lens member, which as a whole is shiftable relative to the sluicing member, comprises an objective coil 5 for portraying the object to be examined. The coil 5 is provided with an upper cover 6 and a lower conical neck 7 ground into a corresponding conical upper end of the stationary part 8 of the evacuated microscope vessel. Screening cylinders 9 are provided in the element 8 for protecting the electron beam passing through the inner cylinder from outer magnetic fields.

For adjusting the electron microscope so as to portray a selected section of the object to be examined, adjusting screws 10 are provided which may be screwed upwardly or downwardly in supports 11. The screws 10 are operated by means of a rod structure 22. The movement of the screws 10 is transmitted through a lever 12 upon a pressure element 13 fixedly mounted on the element 1. This movement is opposed by a resilient holding element 14 positioned opposite the pressure element 13. While the cross section illustrated shows only one screw 10, two screws are provided in other axial cross sections so as to permit moving the body 1 in any direction of the plane of division. Each of the screws 10 cooperates with individual elements 12, 13 and 14.

For tightly sealing the annular opening intermediate the parts 1 and 6 which are movable relative to each other, the invention provides a rubber ring 15 the outer portion of which is pressed by means of a compressing ring 16 against the cover 6 and the inner portion of which is pressed by means of a compression ring 17 against an annular flange 18 of the sluicing device 1. For pressing the rings 16 and 17 upon the ring 15, two rings 19 and 20 are provided, the ring 19 having inner threads and being screwed upon the sluicing device 1, and the ring 20 having outer threads and being screwed into an upwardly extending portion of the cover 6. For preventing rotation of the rings 16 and 17 when the threaded rings 19 and 20 are tightened, and for thus protecting the rubber ring 15 from rotational tearing stresses, the rings 16 and 17 are preferably provided with suitable projections or the like. By providing a space between the two intermediate rings 16 and 17 as shown in the drawing, a sufficient portion of the resilient ring 15 remains for adjusting the sluicing device transversely relative to the objective coil or lens 5.

Inasmuch as the distance between the different portions of the rings 19 and 20 may be easily compared by eye, the arrangement according to the invention may also be used for roughly centering the movable portion 1 of the electron microscope relative to the stationary portion 5 and 8.

Although the invention has been described in its specific application for sealing the joint between the parts of an electron microscope containing the sluicing device and the objective coil, it should be understood that the invention may also be applied to any other points of an electron microscope or similar vacuum apparatus where two vessel portions facing each other with their open ends are to be shifted relative to each other and where the atmospheric or vacuum conditions in these parts are to be maintained despite such shifting. For example the invention may be also applied to an electron microscope in which the radiating apparatus for producing the electron beam is to be adjusted relative to the objects to be examined or relative to the object as well as to the condensing coil.

I claim:

1. In an electronic device, the combination of a vacuum vessel having two adjacent vessel portions shiftable relative to each other in the plane of division, said two vessel portions having concentric surfaces respectively extending in parallel to said plane of division and forming an annular interstice so as to permit shifting movements between said portions, an elastic packing ring placed on said surfaces so as to cover said interstice, a pair of concentric intermediate rings placed on said packing ring, and a pair of pressure rings disposed on said intermediate rings respectively for pressing said intermediate rings against the outer peripheral portion and the inner peripheral portion respectively of said packing ring, said pressure rings and said vessel portions having screw threads, the threads of each ring engaging the threads of a different one of said vessel portions.

2. In an electronic device, the combination of a vacuum vessel having two adjacent vessel portions shiftable relative to each other in the plane of division, said two vessel portions having concentric surfaces respectively extending in parallel to said plane of division and forming an annular interstice so as to permit shifting movements between said portions, an elastic packing ring placed on said surfaces so as to cover said interstice, a pair of pressure rings disposed concentrically on said packing ring for pressing the outer peripheral portion of said packing ring against one of said vessel portions and the inner peripheral portion of said packing ring against said other vessel portion, and tightening means for individually forcing said two pressure rings onto said packing ring, said tightening means engaging said two vessel portions respectively.

3. In an electron microscope having two elements forming adjacent portions of a vacuum vessel and being shiftable relative to each other in a plane transverse to the electron-optical axis, one of said vessel elements having an annular surface in parallel to said transversal plane, said other vessel element having a peripherally projecting flange having an annular surface radially spaced from but substantially flush with the aforesaid annular surface, a packing ring disposed on said surfaces so as to cover the interstice between them, a pair of pressure rings disposed concentrically on said packing ring for pressing the outer peripheral portion of said packing ring against one of said surfaces and the inner peripheral portion of said packing ring against said other surface, the outer of said pressure rings being threaded at its outer periphery, the inner of said pressure rings being threaded at its inner periphery, and said vessel portions having threads engaging the threads of said pressure rings respectively.

4. In an electron microscope having two elements forming adjacent portions of a vacuum vessel and being shiftable relative to each other in a plane transverse to the electron-optical axis, one of said vessel elements containing an objective lens and having a cover plate extending transverse to said axis, said cover plate having an annular groove and an annular surface surrounding said groove, said other vessel element comprising means for holding an object to be examined and having a radially projecting flange disposed in said groove, said flange having an annular surface radially spaced from but flush with the aforesaid annular surface, a packing ring disposed on said surfaces so as to cover the interstice between them, a pair of pressure rings disposed concentrically on said packing ring for pressing the outer peripheral portion of said packing ring against said first annular surface and the inner peripheral portion of said packing ring against said annular surface of said flange, and tightening means for individually forcing said two pressure rings onto said packing ring, said tightening means engaging said two vessel portions respectively.

5. In an electronic device, the combination of a vacuum vessel having two adjacent vessel portions shiftable relative to each other in the plane of division, said two vessel portions having each an annular surface, said two surfaces being arranged concentrically relative to each other, one of said surfaces being surrounded by and spaced from said other surface so as to form an annular interstice, an elastic packing ring placed on said surfaces so as to cover said interstice, means for pressing the outer peripheral portion of said ring against only the outer one of said surfaces, and separate means for pressing the inner peripheral portion of said ring against only the inner one of said surfaces.

HANS SCHUCHMANN.